(No Model.)
S. P. DAVIS.
TWO WHEELED VEHICLE.
No. 345,371. Patented July 13, 1886.
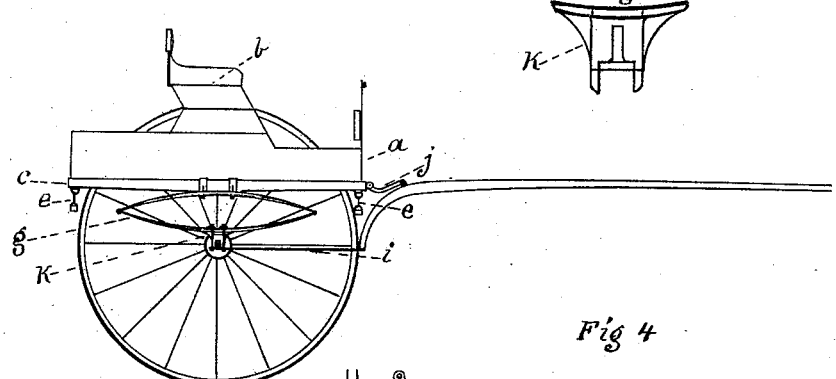
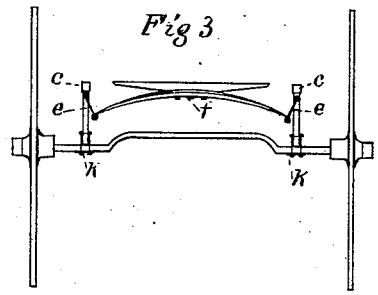
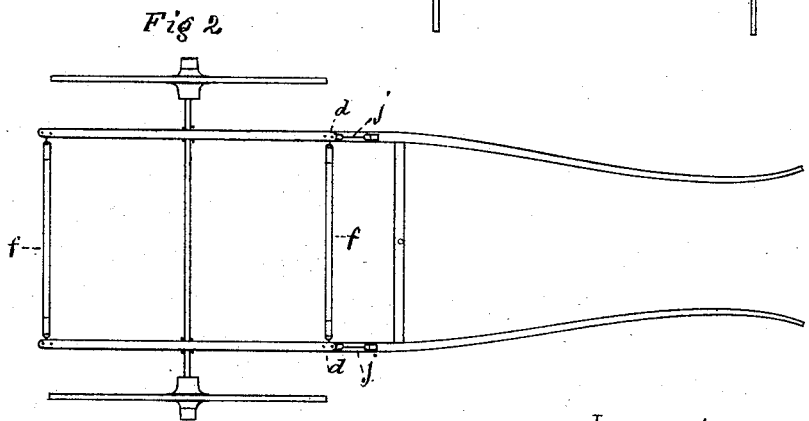
Witnesses,
G. A. Haste
Ferdinand Imhorst
Inventor:
Solomon P. Davis
By his Attorney.
Alphonso P. Smith

UNITED STATES PATENT OFFICE.

SOLOMON PAUL DAVIS, OF NAPA CITY, CALIFORNIA.

TWO-WHEELED VEHICLE.

SPECIFICATION forming part of Letters Patent No. 345,371, dated July 13, 1886.

Application filed September 7, 1885. Serial No. 176,437. (No model.)

*To all whom it may concern:*

Be it known that I, SOLOMON PAUL DAVIS, a resident of Napa City and county, State of California, have invented a new and useful Improved Two-Wheel Vehicle; and I hereby declare that the following is a full, clear, and exact description of the same, reference being had to the accompanying drawings.

My invention relates to the construction of a two-wheel vehicle in which the form and arrangement of springs and the manner of attaching them reduces jolting and pitching and secures an easy seat.

The following description fully explains the nature of my said invention and the manner in which I proceed to construct, apply, and use the same, the accompanying drawings being referred to by figures and letters.

Figure 1 represents a side elevation of the cart. Fig. 2 is a plan view of the cart with the body removed, showing the end springs and the shackles attaching side bars to shafts. Fig. 3 represents an end elevation of the cart, showing an end spring and its attachment to the side bars. Fig. 4 shows two views of the shackle attaching the end springs to the side bars. Fig. 5 shows two views of the shackle attaching the side bars to the shafts. Fig. 6 represents a side elevation of the yoke-seat for attaching the elliptic springs to the axle.

The object of my improved two-wheel vehicle is to provide an easy-swaying seat, free from the jolting motion of the common cart. I accomplish this by swinging the body of the vehicle free from the axle, and by arrangement and form of the springs and the manner of their attachment.

The body of the cart, $a$, is of the ordinary construction, and has an adjustable seat, $b$. I provide side bars, $c$, having on their forward ends and on their under sides near the ends lugs $d$, for attaching shackles. The shackles have forked ends in which are holes for bolts by which they are attached to the lugs and the springs, the shackle $e$ being straight and the shackle $j$ curved near the inner end, Figs. 4, 5. Half-elliptic springs $f$ are placed at each end of the body of the cart, the shackles $e$ connecting them with the side bars, and upon these springs the body swings, Fig. 3. The side bars rest upon elliptic springs $g$, and are attached by clip-yokes and bolts, and the elliptic springs rest in a yoke-seat, $k$, upon the axle to which the seat is bolted. The curved shackles $j$ are attached to the lugs in the forward end of the side bars, from which they connect with the lugs on the upper side of the shaft. To the inner curved end of the shafts I attach a single leaf-spring, $i$, which extends to the under side of the axle, where it is bolted, Fig. 1. By this arrangement of several springs and their form and shackle attachment I secure an easy gently-swaying seat, entirely free from the jolting blows of the rigid axle. In driving over rough and broken ground, or over ruts and shock-holes, the half-elliptic springs, attached by free-playing shackles to the side bars, expand and straighten and throw the lower end of the shackles out, and when they contract and recover their tension the shackles are drawn in. An easy seat is further promoted by the action of the curved shackles $j$, which connect the side bars with the shafts, in connection with the action of the single leaf-springs $i$, which connect the shafts with the axle, the combined action overcoming the effects of the horse's movements upon the driver's seat.

The seat may be adjusted by thumb-screws, to equalize the weight of the load upon the horse.

Having thus fully described my invention, what I claim, and desire to secure by Letters Patent, is—

1. A two-wheeled vehicle having the elliptical springs $g$, mounted upon the axle, and the side bars, $c$, mounted upon the elliptical springs, the half-elliptical springs $f$, secured in the center to the body and at each end to the side bars through the medium of links $e$, pivoted to swing loosely at each end, and the front links, $j$, connecting the front of the body to the shafts.

2. In a two-wheeled vehicle, the combination of the shackles $e\ j$, side bars, $c$, half-elliptic springs $f$, single-leaf spring $i$, elliptic springs $g$, yoke-seat $k$, and the adjustable seat $b$, substantially as described, and for the purposes set forth.

In testimony whereof I have hereunto set my hand and seal.

SOLOMON PAUL DAVIS. [L. S.]

Witnesses:
A. B. SMITH,
FERDINAND IMHORST.